US010128515B2

(12) United States Patent
Yuzuriha et al.

(10) Patent No.: US 10,128,515 B2
(45) Date of Patent: Nov. 13, 2018

(54) FUEL CELL MODULE

(71) Applicant: HONDA MOTOR CO., LTD., Tokyo (JP)

(72) Inventors: Akihito Yuzuriha, Wako (JP); Ayaka Nango, Wako (JP); Hiroshi Ichikawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 405 days.

(21) Appl. No.: 15/002,446

(22) Filed: Jan. 21, 2016

(65) Prior Publication Data

US 2016/0218379 A1    Jul. 28, 2016

(30) Foreign Application Priority Data

Jan. 26, 2015  (JP) ................ 2015-012221

(51) Int. Cl.
| *H01M 8/04007* | (2016.01) |
| *H01M 8/04* | (2016.01) |
| *H01M 8/0612* | (2016.01) |
| *H01M 8/24* | (2016.01) |
| *H01M 8/04014* | (2016.01) |
| *H01M 8/2465* | (2016.01) |
| *H01M 8/2475* | (2016.01) |
| *H01M 8/124* | (2016.01) |

(52) U.S. Cl.
CPC ... *H01M 8/04067* (2013.01); *H01M 8/04022* (2013.01); *H01M 8/0625* (2013.01); *H01M 8/2465* (2013.01); *H01M 8/2475* (2013.01); *H01M 2008/1293* (2013.01)

(58) Field of Classification Search
CPC .. H01M 8/04; H01M 8/04007; H01M 8/0612; H01M 8/0414; H01M 8/24; H01M 8/2465; H01M 8/2483
See application file for complete search history.

(56) References Cited

U.S. PATENT DOCUMENTS

| 4,861,348 A | * | 8/1989 | Koyama | ................ B01J 8/062 |
| | | | | 422/202 |
| 6,077,620 A | * | 6/2000 | Pettit | ..................... B01J 8/0438 |
| | | | | 429/425 |
| 2011/0159391 A1 | | 6/2011 | Saito | |

FOREIGN PATENT DOCUMENTS

| EP | 2 608 304 A1 | 6/2013 |
| JP | 2013-131329 | 7/2013 |
| JP | 2013-191316 | 9/2013 |

OTHER PUBLICATIONS

German Search Report dated Oct. 12, 2016. English translation included.

* cited by examiner

*Primary Examiner* — Kenneth J Douyette
(74) *Attorney, Agent, or Firm* — Rankin, Hill & Clark LLP

(57) ABSTRACT

A fuel cell module includes a fuel cell unit and a casing. The casing has hollow surface members including a front surface member, a rear surface member, a right surface member, a left surface member, and a lower surface member. A single continuous air channel is formed by connecting spaces inside of these surface members. The air channel has a fluid inlet on the front surface member for allowing the air to flow initially in the front surface member. A first flange and a second flange are provided on the front surface member.

10 Claims, 4 Drawing Sheets

FUEL CELL MODULE

CROSS-REFERENCE TO RELATED APPLICATION

This application is based upon and claims the benefit of priority from Japanese Patent Application No. 2015-012221 filed on Jan. 26, 2015, the contents of which are incorporated herein by reference.

BACKGROUND OF THE INVENTION

Field of the Invention

The present invention relates to a fuel cell module including a fuel cell stack formed by stacking a plurality of fuel cells for generating electrical energy by electrochemical reactions of a fuel gas and an oxygen-containing gas, and a casing containing the fuel cell stack.

Description of the Related Art

In general, a solid oxide fuel cell (SOFC) employs a solid electrolyte. The solid electrolyte is an oxide ion conductor such as stabilized zirconia. The solid electrolyte is interposed between an anode and a cathode to form an electrolyte electrode assembly (hereinafter also referred to as the MEA). The electrolyte electrode assembly is sandwiched between separators (bipolar plates). In use, generally, predetermined numbers of the electrolyte electrode assemblies and the separators are stacked together to form a fuel cell stack.

In the SOFC, since the operating temperature is relatively high, in the case where a power generation chamber is provided in a casing, the temperature of the upper part of the power generation chamber tends to be low in comparison with the lower part of the power generation chamber. In particular, in the case where a combustion area is provided above the stack which is placed in the power generation chamber of the casing, temperature of the upper part of the power generation chamber is considerably high in comparison with the lower part of the power generation chamber. Consequently, degradation may occur undesirably at welding positions or attachment positions.

In an attempt to improve the durability of the casing and extend the lifetime of the casing, for example, a fuel cell apparatus as disclosed in Japanese Laid-Open Patent Publication No. 2013-131329 is known. This fuel cell apparatus includes a casing having a first U-plate member and a second U-plate member. The first U-plate member is formed by a first upper surface opening section which is opened upwardly, two first side walls which face each other, and a first bottom plate connecting lower portions of the first side walls. The second U-plate member is formed by a second upper surface opening section which is opened upwardly, two second side walls which face each other, and a second bottom plate connecting lower portions of the second side walls.

The casing is formed by stacking the first U-plate member and the second U-plate member such that the first upper surface opening section and the second upper surface opening section are positioned on the upper side, with a space between the first U-plate member and the second U-plate member in the thickness direction. At least a portion of at least one of a cathode gas channel and an exhaust gas channel includes a side space channel formed by the first side wall and the second side wall which face each other, and a bottom space channel formed by the first bottom wall and the second bottom wall which face each other. The bottom space channel is connected to the side space channel.

Specifically, in Japanese Laid-Open Patent Publication No. 2013-131329 mentioned above, the cathode gas channel is formed in the side space channel and the bottom space channel, and an exhaust gas channel is formed along the inner side of the cathode gas channel. According to the disclosure, in the structure, since the cathode gas in the cathode gas channel is heated beforehand by the exhaust gas flowing in the exhaust gas channel, and the cathode gas as the air having a relatively low temperature flows along outer surfaces of the casing, heat radiation is suppressed.

SUMMARY OF THE INVENTION

However, in some of components of the fuel cell module, the heat resistant temperature is lower than the module surface temperature. In a heating source of the exhaust gas combustor, e.g., in a glow plug (heating member), since the heat resistant temperature of the internal component (joint portion of wiring) in the fixing flange is low, due to the exposure of the glow plug to the module surface temperature, the fixing flange tends to be degraded easily. Therefore, the durability of the glow plug is poor, and the lifetime is short.

The present invention has been made to solve the problem of this type, and an object of the present invention is to provide a fuel cell module having compact structure, in which heat radiation to the outside of a casing is suppressed, and it is possible to cool a fixing flange of a heating member easily and reliably.

A fuel cell module according to the present invention includes a fuel cell stack, a reformer, an air preheater, an exhaust gas combustor, a start-up combustor, and a casing. The casing contains the fuel cell stack, the reformer, the air preheater, the exhaust gas combustor, and the start-up combustor. The fuel cell stack is formed by stacking a plurality of fuel cells for generating electrical energy by electrochemical reactions of a fuel gas and an oxygen-containing gas. The reformer reforms a raw fuel chiefly containing hydrocarbon to produce the fuel gas supplied to the fuel cell stack.

The air preheater heats the oxygen-containing gas by heat exchange with a combustion gas and supplying the oxygen-containing gas to the fuel cell stack. The exhaust gas combustor combusts the fuel gas discharged from the fuel cell stack as a fuel exhaust gas and the oxygen-containing gas discharged from the fuel cell stack as an oxygen-containing exhaust gas to produce the combustion gas. The start-up combustor combusts the raw fuel and the oxygen-containing gas to produce the combustion gas.

The casing includes a plurality of hollow surface members to form outer wall surfaces of the casing. A single continuous fluid channel is formed by connecting spaces inside the surface members. The fluid channel has a fluid inlet in a first surface member for allowing fluid to flow initially in the first surface member. A fixing flange of a heating member inserted into the casing to form a heating source of the exhaust gas combustor is provided on the first surface member.

In the present invention, a single fluid channel is formed inside the casing. All the fluid which flows into the fluid channel is supplied initially to the first surface member. In the structure, the fluid having relatively low temperature before being heated flows inside the first surface member to remove the heat of the fixing flange of the heating member. Thus, with the simple structure, heat radiation to the outside of the casing is suppressed, and it becomes possible to cool the fixing flange of the heating member.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
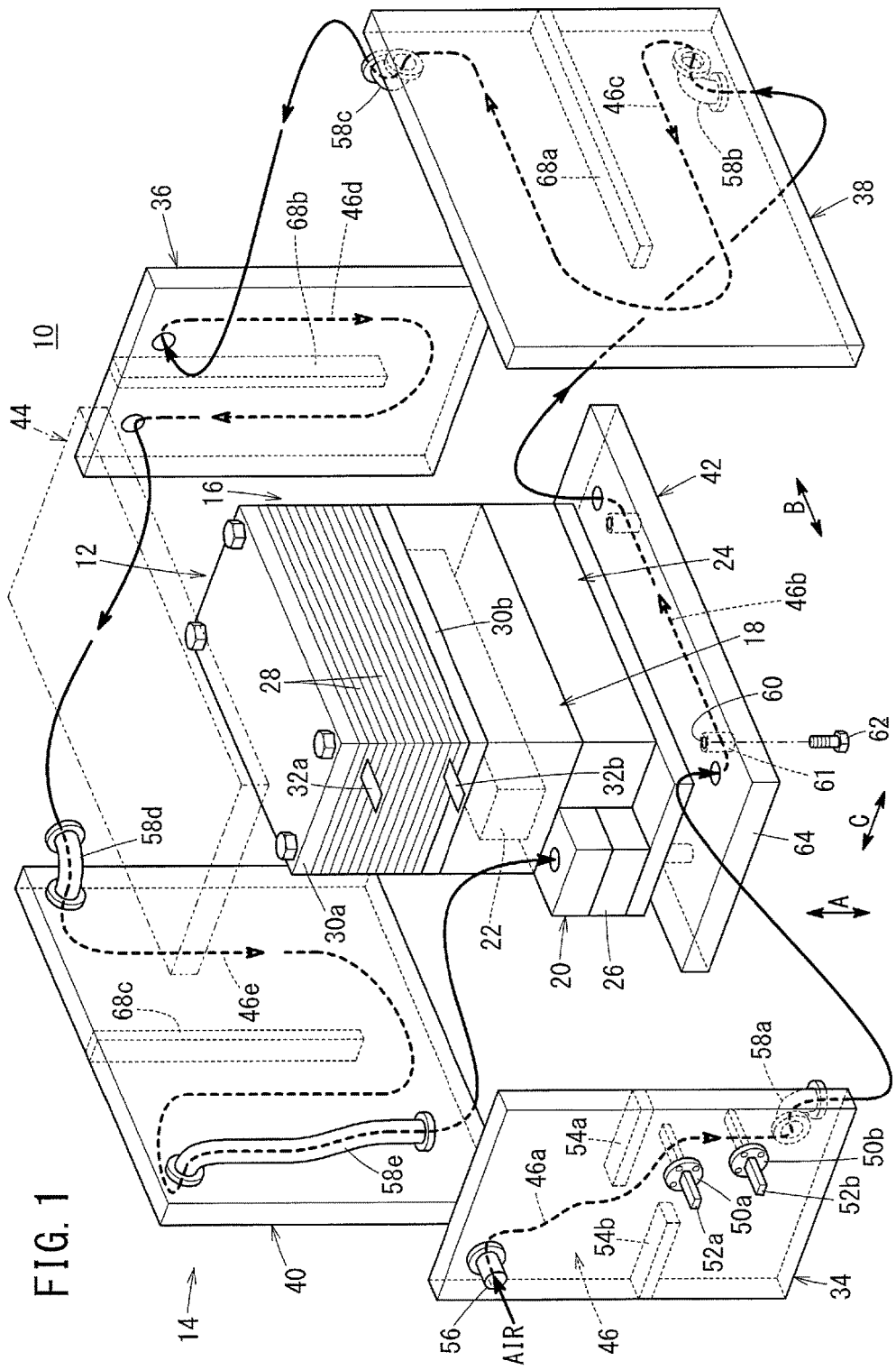
FIG. 1 is a partial exploded perspective view showing a fuel cell module according to an embodiment of the present invention.
Figure 2:
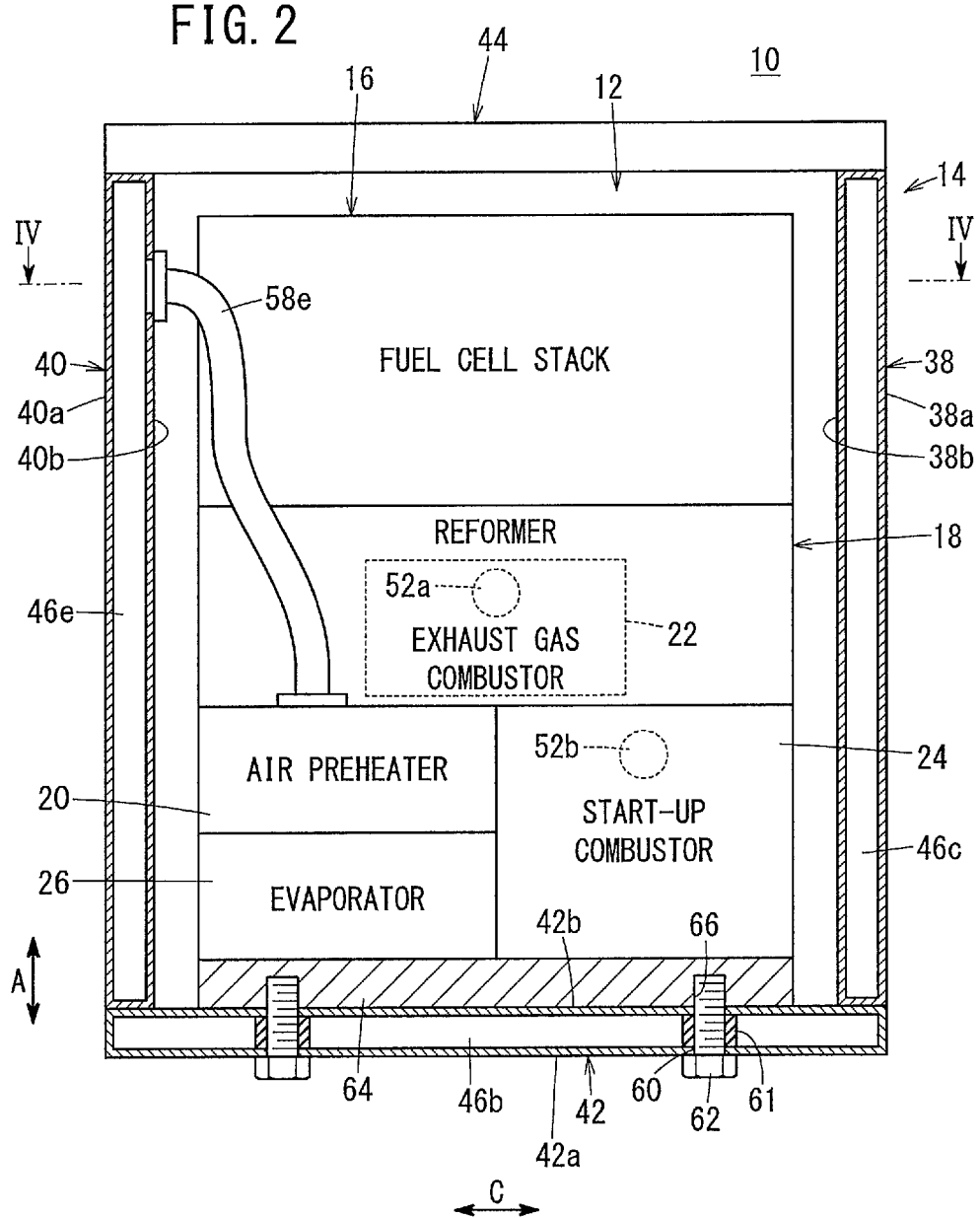
FIG. 2 is a diagram schematically showing the fuel cell module.

A fuel cell module 10 according to an embodiment of the present invention shown in FIGS. 1 and 2 may be used in a stationary application. Additionally, the fuel cell module 10 may be used in various applications. For example, the fuel cell module 10 may be mounted in a vehicle. The fuel cell module 10 includes a fuel cell unit 12. The fuel cell unit 12 is placed in a casing 14.

The fuel cell unit 12 is formed by assembling a fuel cell stack 16, a reformer 18, an air preheater 20, an exhaust gas combustor 22, a start-up combustor 24, and an evaporator 26. The fuel cell unit 12 has a substantially rectangular parallelepiped shape (or substantially cubic shape) as a whole. In effect, the air preheater 20 and the evaporator 26 protrude outward in a direction indicated by an arrow B (see FIG. 1).

The fuel cell stack 16 generates electrical energy by electrochemical reactions of a fuel gas (mixed gas of a hydrogen gas, methane, and carbon monoxide) and an oxygen-containing gas (air). As shown in FIG. 1, the fuel cell stack 16 includes a plurality of flat plate shaped solid oxide fuel cells 28. The fuel cells 28 are stacked together in a vertical direction indicated by an arrow A (or in a horizontal direction).

At both ends of the fuel cells 28 in the stacking direction, end plates 30a, 30b are provided to apply a tightening load to the fuel cells 28 in the stacking direction. At both ends of the fuel cells 28 in the stacking direction, output terminals 32a, 32b are provided to supply electrical energy to the outside.

For example, each of the fuel cells 28 includes an electrolyte electrode assembly (MEA). The electrolyte electrode assembly includes a cathode, an anode, and an electrolyte interposed between the cathode and the anode. The electrolyte is an oxide ion conductor made of, e.g., stabilized zirconia. The electrolyte electrode assembly is sandwiched between a cathode separator and an anode separator. An oxygen-containing gas channel for supplying an oxygen-containing gas to the cathode is formed in the cathode separator, and a fuel gas channel for supplying a fuel gas to the anode is formed in the anode separator.

As shown in FIGS. 1 and 2, the fuel cell module 10 includes a reformer 18 provided adjacent to the fuel cell stack 16, and an exhaust gas combustor 22 provided inside the reformer 18. The reformer 18 reforms a mixed gas of water vapor and a raw fuel (e.g., city gas) chiefly containing hydrocarbon, and produces the fuel gas supplied to the fuel cell stack 16. The exhaust gas combustor 22 combusts the fuel gas discharged from the fuel cell stack 16 as a fuel exhaust gas and the oxygen-containing gas discharged from the fuel cell stack 16 as an oxygen-containing exhaust gas to produce a combustion gas.

An air preheater 20 and a start-up combustor 24 are provided adjacent to the reformer 18, opposite to the fuel cell stack 16. An evaporator 26 is stacked on the air preheater 20. The air preheater 20 heats the oxygen-containing gas by heat exchange with the combustion gas, and supplies the oxygen-containing gas to the fuel cell stack 16. The start-up combustor 24 combusts the raw fuel (fuel gas) and the oxygen-containing gas to produce the combustion gas. The evaporator 26 evaporates water, and supplies the water vapor to the reformer 18.

The casing 14 includes a plurality of, e.g., six hollow surface members to form a substantially rectangular parallelepiped shape (or substantially cubic shape), similar to the shape of the fuel cell unit 12. The six surface members are a front surface member (first surface member) 34, a rear surface member 36, a right surface member 38, a left surface member (second surface member) 40, a lower surface member (third surface member) 42, and an upper surface member 44. Each of the front surface member 34, the rear surface member 36, the right surface member 38, the left surface member 40, the lower surface member 42, and the upper surface member 44 has a rectangular shape or a square shape. A continuous single air channel (fluid channel) 46 is formed by connecting respective spaces inside the front surface member 34, the rear surface member 36, the right surface member 38, the left surface member 40, the lower surface member 42, and the upper surface member 44 (see FIG. 3).

Figure 4:
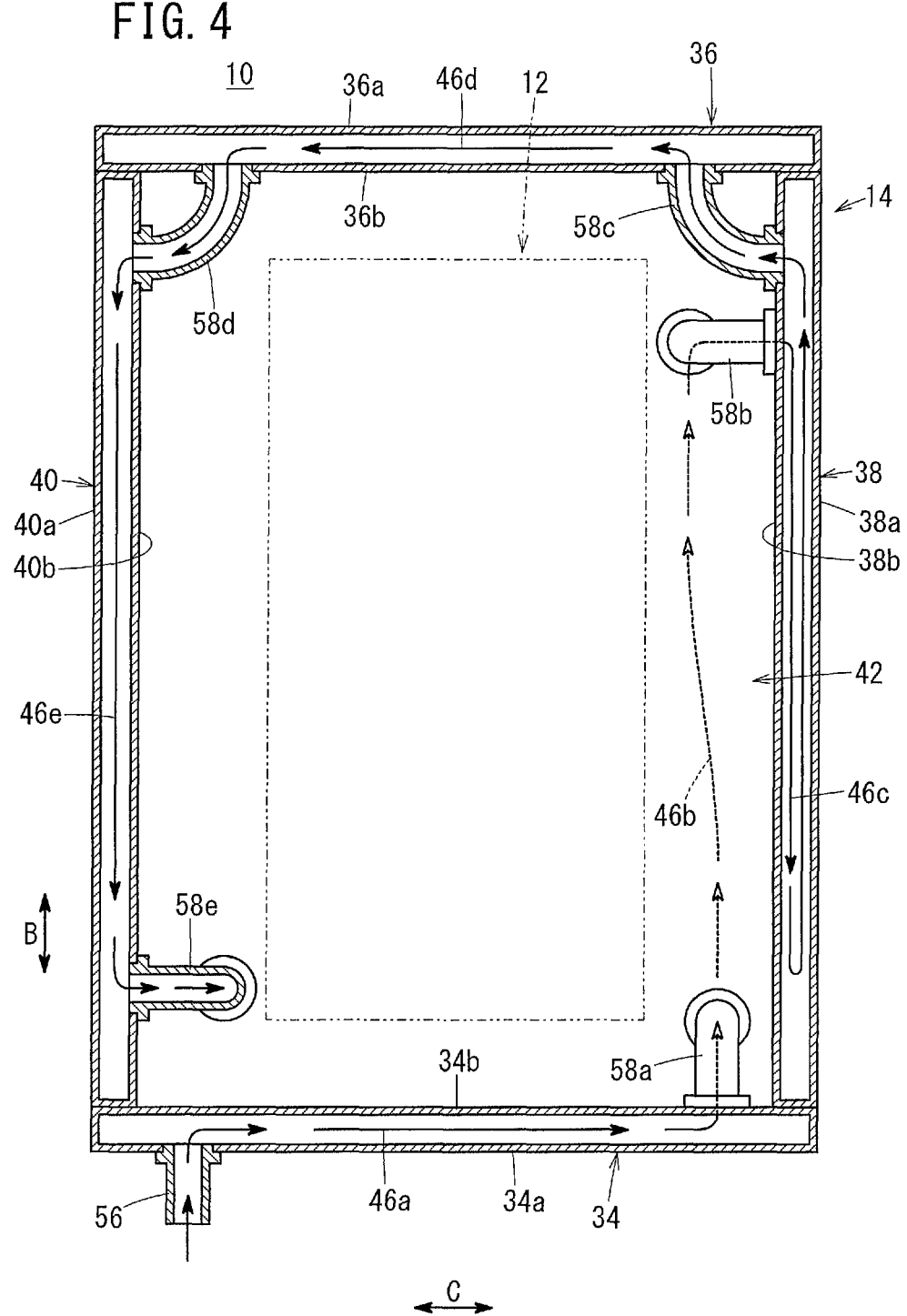
FIG. 4 is a cross sectional view showing the casing taken along a line IV-IV in FIG. 2.

As shown in FIG. 4, the front surface member 34 is formed by joining, e.g., two plate members 34a, 34b together, and a first space 46a is formed inside the front surface member 34. As shown in FIG. 1, a first flange (fixing flange) 50a and a second flange (fixing flange) 50b are attached to the front surface member 34 (fixed to the front surface member 34 using screws). A first glow plug (heating member) 52a is held by the first flange 50a, and a second glow plug (heating member) 52b is held by the second flange 50b. The first glow plug 52a is inserted into the exhaust gas combustor 22 to ignite a mixed gas of the fuel exhaust and the oxygen-containing exhaust gas. The second glow plug 52b is inserted into the start-up combustor 24 to ignite a mixed gas of the raw fuel and the oxygen-containing gas.

Figure 3:
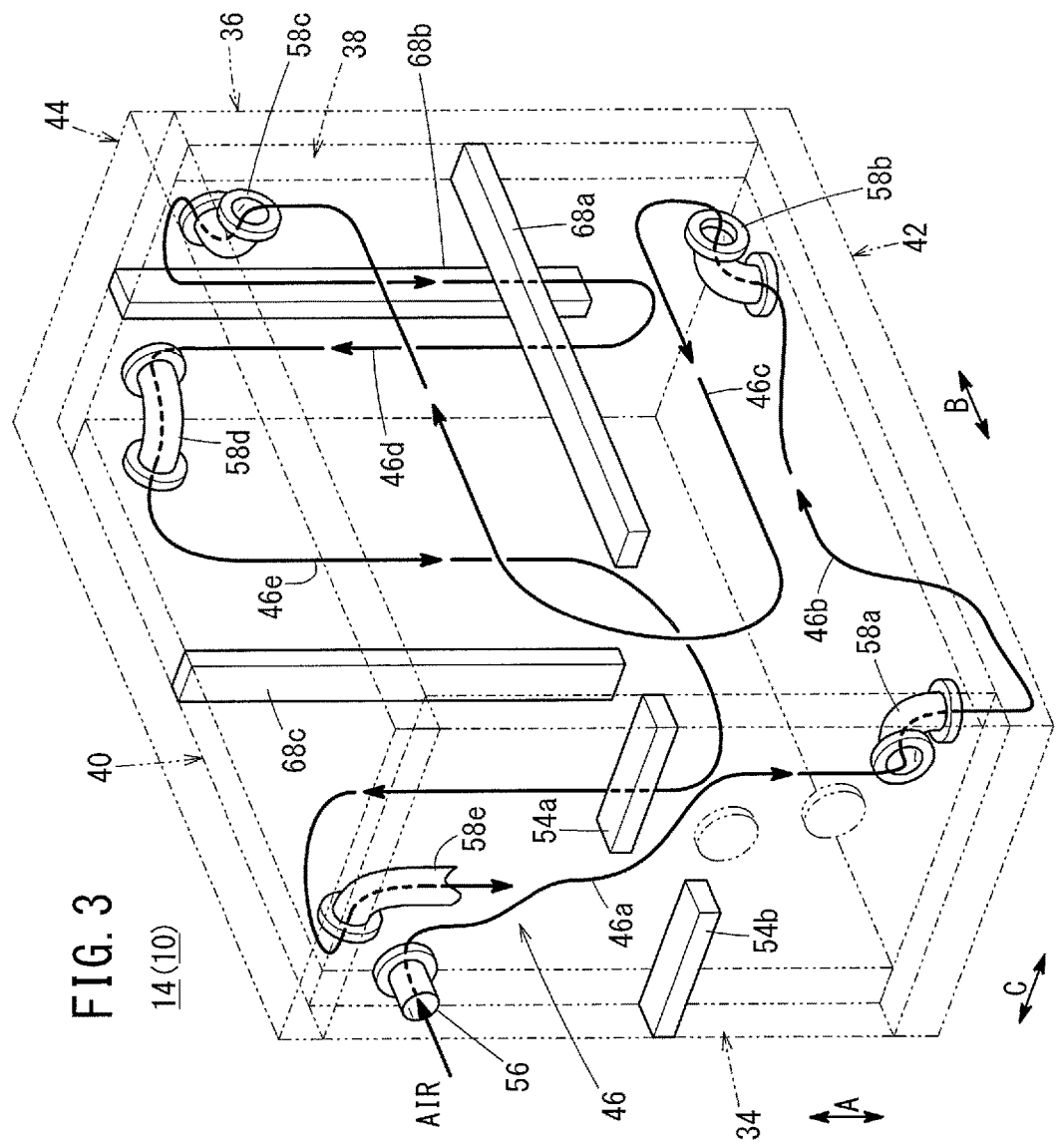
FIG. 3 is a view showing the flow of the air flowing inside a casing of the fuel cell module.

As shown in FIGS. 1 and 3, guide plates 54a, 54b for guiding the air (fluid) to the first flange 50a and the second flange 50b extend horizontally in the first space 46a of the front surface member 34 in a zigzag pattern relative to each other. An air inlet pipe 56 is provided at an upper position of the outer surface (plate member 34a) of the front surface member 34 for allowing the air to flow into the front surface member 34. One end of a first tube 58a is connected to at a lower position of the inner surface (plate member 34b) of the front surface member 34. The first tube 58a is connected to the first space 46a. The other end of the first tube 58a is connected to the lower surface member 42.

As shown in FIGS. 1 and 2, the lower surface member 42 is formed by joining, e.g., two plate members 42a, 42b together. A second space 46b is formed inside the lower surface member 42. The second space 46b is connected to the first space 46a through the first tube 58a. A plurality of holes 60 are formed in the lower surface member 42. The holes 60 are sealed from the second space 46b using seal members 61. Bolts 62 are inserted into the holes 60, and the bolts 62 are fitted to screw holes 66 of a support plate 64 (see FIG. 2). The fuel cell unit 12 is placed on the support plate 64, and the fuel cell unit 12 is fixed to only the lower surface member 42.

One end of a second tube 58b is connected to a marginal end position of the lower surface member 42 on a side closer to the rear surface member 36. The second tube 58b is connected to the second space 46b. The other end of the second tube 58b is connected to a lower position of the right surface member 38. As shown in FIGS. 2 and 4, the right surface member 38 is formed by joining, e.g., two plate member 38a, 38b together. A third space 46c is formed in the right surface member 38. The third space 46c is connected to the second space 46b through the second tube 58b.

As shown in FIGS. 1 and 3, a first partition plate 68a is provided inside the third space 46c of the right surface member 38 for forming the fluid channel 46 in a serpentine pattern and increasing the channel length of the fluid channel 46. The first partition plate 68a extends in a horizontal direction indicated by an arrow B at a substantially intermediate height position of the third space 46c. One end of the third tube 58c is connected to an upper marginal end position of the right surface member 38 on a side closer to the rear surface member 36. The third tube 58c is connected to the third space 46c. The other end of the third tube 58c is connected to an upper position of one end of the rear surface member 36 in a direction indicated by an arrow C.

As shown in FIG. 4, the rear surface member 36 is formed by joining, e.g., two plate member 36a, 36b together. A fourth space 46d is formed inside the rear surface member 36. The fourth space 46d is connected to the third space 46c through the third tube 58c. As shown in FIGS. 1 and 3, a second partition plate 68b is provided in the fourth space 46d of the rear surface member 36 for forming the fluid channel 46 in a serpentine pattern and increasing the channel length of the fluid channel 46. The second partition plate 68b extends in a vertical direction indicated by an arrow A at a substantially intermediate position of the fourth space 46d in the horizontal direction.

One end of the fourth tube 58d is connected to an upper position of the other end of the rear surface member 36 in the direction indicated by the arrow C. The fourth tube 58d is connected to the fourth space 46d. The other end of the fourth tube 58d is connected to an upper position of one end of the left surface member 40 in the direction indicated by the arrow B.

As shown in FIG. 4, the left surface member 40 is formed by joining, e.g., two plate members 40a, 40b together. A fifth space 46e is formed in the left surface member 40. The fifth space 46e is connected to the fourth space 46d through the fourth tube 58d. As shown in FIGS. 1 and 3, a third partition plate 68c is provided in the fifth space 46e of the left surface member 40 for forming the fluid channel 46 in a serpentine pattern and increasing the channel length of the fluid channel 46. The third partition plate 68c extends in the vertical direction indicated by the arrow A at a substantially intermediate position of the fifth space 46e in the horizontal direction.

One end of an elongated fifth tube 58e is connected to the upper part of the other end of the left surface member 40 in the direction indicated by the arrow B. The fifth tube 58e is connected to the fifth space 46e. The other end of the fifth tube 58e is connected to an air supply pipe (not shown) of the air preheater 20.

The air channel 46 is formed by connecting the first space 46a of the front surface member 34, the second space 46b of the lower surface member 42, the third space 46c of the right surface member 38, the fourth space 46d of the rear surface member 36, and the fifth space 46e of the left surface member 40 together.

Operation of this fuel cell module 10 will be described below.

At the time of starting operation of the fuel cell module 10, the air and the raw fuel are supplied to the start-up combustor 24. Specifically, for example, a raw fuel such as the city gas (containing $CH_4$, $C_2H_6$, $C_3H_8$, $C_4H_{10}$) is supplied to start-up combustor 24. The mixed gas of the raw fuel and the air is ignited by operation of the second glow plug 52b to start combustion, and a combustion gas is produced.

The combustion gas is supplied to a combustion gas pipe (not shown) of the air preheater 20, and the air as the oxygen-containing gas is supplied to the air preheater 20. Specifically, as shown in FIGS. 1 and 3, the air flows from the air inlet pipe 56 into the first space 46a of the front surface member 34.

In the first space 46a, the air flows from upper to lower positions. By guiding operation of the guide plates 54a, 54b, the air flows concentrated toward the first flange 50a and the second flange 50b. After the air moves to a lower position of the first space 46a, the air flows through the first tube 58a into the second space 46b of the lower surface member 42. After the air flows through the second space 46b in the direction indicated by the arrow B, the air flows through the second tube 58b into the third space 46c of the right surface member 38.

In the third space 46c, by operation of the first partition plate 68a, the air moves upward in a serpentine pattern. Then, the air flows through the third tube 58c into the fourth space 46d of the rear surface member 36. After the air flows into the fourth space 46d and moves downward, by operation of the second partition plate 68b, the air moves upward, and flows through the fourth tube 58d into the fifth space 46e of the left surface member 40. After the air flows into the fifth space 46e, the air moves downward, and then, by operation of the third partition plate 68c moves upward, and flows through the fifth tube 58e into an air supply pipe (not shown) of the air preheater 20.

In the air preheater 20, the air from the air channel 46 is heated by heat exchange with the combustion gas. The heated hot air is supplied to the oxygen-containing gas system (oxygen-containing gas channels) of the fuel cell stack 16. Thus, the temperature of the fuel cell stack 16 is raised by the heated hot air. Further, after the combustion gas is consumed as a heat source for heating the reformer 18, the combustion gas is discharged to the outside. It should be noted that the combustion gas may also be used as a heat source for heating the evaporator 26.

When the fuel cell stack 16 and the reformer 18 are heated to preset temperatures, respectively, supply of the raw fuel and the air to the start-up combustor 24 is stopped. In the meanwhile, water and the raw fuel are supplied to the evaporator 26. Thus, the water is evaporated, and water vapor is produced. The mixed gas of the water vapor and the raw fuel is supplied into the reformer 18. In the reformer 18, steam reforming of the mixed gas is performed. $C_{2+}$ hydrocarbon is removed (reformed), and a reformed gas chiefly containing methane is obtained.

The reformed gas is supplied to the fuel gas system (fuel gas channels) of the fuel cell stack 16. After the air is heated at the air preheater 20, the heated air is supplied to the oxygen-containing gas system (oxygen-containing gas channels) of the fuel cell stack 16. Thus, in each of the fuel cells 28, electrical energy is produced by chemical reactions of the oxygen and the air.

The fuel gas discharged from the fuel cell stack 16 as the fuel exhaust gas and the oxygen-containing gas discharged from the fuel cell stack 16 as the oxygen-containing exhaust gas flow into the exhaust gas combustor 22. In the exhaust gas combustor 22, the fuel exhaust gas and the oxygen-containing exhaust gas are combusted, and the combustion gas is produced. In the exhaust gas combustor 22, the first glow plug 52a is operated as necessary, and the mixed gas of the fuel exhaust gas and the oxygen-containing exhaust gas is ignited.

In the embodiment of the present invention, the single air channel 46 is formed inside the casing 14. All the air flowing into the air channel 46 is initially supplied to the front surface member 34. Thus, before air is heated, the air having a relatively low temperature flows through the first space 46a in the front surface member 34, and it is possible to suitably remove the heat from the first flange 50a of the first glow plug (heating member) 52a and the second flange 50b of the second glow plug (heating member) 52b.

Therefore, in the fuel cell module 10, with the compact structure, it becomes possible to suppress heat radiation to the outside of the casing 14, and reliably and easily cool the first flange 50a and the second flange 50b.
Accordingly, it is possible to maintain the temperature of the first flange 50a and the second flange 50b at the heat resistant temperature or less. It becomes possible to use the first glow plug 52a and the second glow plug 52b for a long period of time, and extend the lifetime of the first glow plug 52a and the second glow plug 52b.

Further, the fluid is the air (oxygen-containing gas) to be supplied to the fuel cell stack 16. Therefore, the flow of the air through the air channel 46 functions as an air heat insulating layer, and heat radiation to the outside of the casing 14 is suppressed. Moreover, since the air is heated by absorbing heat, and then, supplied to the fuel cell stack 16, improvement in the performance of starting operation of the fuel cell stack 16 is achieved effectively.

As the fluid, raw fuel (fuel gas) to be supplied to the fuel cell stack 16 may be used as well. A gas heat insulating layer is formed by the flow of the raw fuel through the fluid channel, and heat radiation to the outside of the casing 14 is suppressed. Further, improvement in the performance of starting operation of the fuel cell stack 16 is achieved effectively.

Further, the guide plates 54a, 54b for guiding the air to the first flange 50a and the second flange 50b are placed in the first space 46a of the front surface member 34. Thus, the air supplied to the first space 46a of the front surface member 34 reliably flows toward the first flange 50a and the second flange 50b. Accordingly, it becomes possible to efficiently cool the first flange 50a and the second flange 50b.

Further, in the casing 14, the first partition plate 68a, the second partition plate 68b, and the third partition plate 68c for increasing the channel length of the air channel 46 are provided for at least one surface member (the right surface member 38, the rear surface member 36, and the left surface member 40 in this embodiment) other than the front surface member 34. In the structure, the air flowing through the air channel 46 receives heat for a longer period of time. It is possible to supply the suitably heated air to the fuel cell stack 16.

Further, the air channel 46 has the fifth tube 58e as the air outlet in the left surface member 40 which is closest to the air preheater 20. In the structure, after the air flows through the air channel 46, the heated air is supplied to the air preheater 20. After the temperature of the air is increased to the desired temperature, the air is supplied to the fuel cell stack 16. Moreover, since the distance between the air outlet and the air preheater 20 is reduced, and the fifth tube 58e for connecting the air outlet and the air preheater 20 is shortened effectively, the structure is economical, and the heat radiation quantity when the air passes through the fifth tube 58e is reduced.

Further, the casing 14 has a substantially cubic shape or a substantially rectangular parallelepiped shape, including the six surface members, i.e., the front surface member 34, the rear surface member 36, the right surface member 38, the left surface member 40, the lower surface member 42, and the upper surface member 44. In this regard, the air channel 46 has the air outlet in the left surface member 40 which is closest to the air preheater 20. The air channel 46 is formed inside of the front surface member 34, the rear surface member 36, the right surface member 38, the left surface member 40, and the lower surface member 42. Preferably, the air channel 46 is provided inside at least three to six surface members.

Thus, it is possible to effectively receive the heat produced inside the casing 14 by the air flowing through the air channel 46. Therefore, it is possible to reduce the amount of heat insulating material used in the casing 14, and achieve size reduction and cost reduction of the fuel cell module 10 as a whole.

Furthermore, the fuel cell module 10 has the evaporator 26 for evaporating water and supplying the water vapor to the reformer 18. In this regard, the fuel cell stack 16, the reformer 18, the air preheater 20, the exhaust gas combustor 22, the start-up combustor 24, and the evaporator 26 are assembled to form the fuel cell unit 12. Further, the fuel cell unit 12 is fixed to only the lower surface member 42 of the casing 14.

Therefore, the fuel cell unit 12 is fastened only to the lower surface member 42 of the casing 14. The fuel cell unit 12 and the casing 14 can individually be deformed by heat, and it becomes possible to reliably suppress heat stress concentration.

Further, in the air channel 46, the air is supplied initially to the first space 46a of the front surface member 34, and then, the air is supplied to the second space 46b of the lower surface member 42. Therefore, the air having a relatively low temperature can be supplied to the second space 46b of the lower surface member 42, and it becomes possible to suitably cool the bolts (fastening section) 62 that fasten the lower surface member 42 and the fuel cell unit 12 together.

Further, the outer shape of the fuel cell unit 12 is similar to the inner shape of the casing 14. Thus, the heat emitted around the fuel cell unit 12 can be suitably received by the air flowing inside the front surface member 34, the rear surface member 36, the right surface member 38, the left surface member 40, and the lower surface member 42. Accordingly, improvement in the heat efficiency is achieved easily.

While the invention has been particularly shown and described with reference to preferred embodiments, it will be understood that variations and modifications can be effected thereto by those skilled in the art without departing from the scope of the invention as defined by the appended claims.

What is claimed is:

1. A fuel cell module comprising:
a fuel cell stack formed by stacking a plurality of fuel cells configured to generate electrical energy by electrochemical reactions of a fuel gas and an oxygen-containing gas;
a reformer configured to reform a raw fuel containing hydrocarbon and produce the fuel gas supplied to the fuel cell stack;
an air preheater configured to heat the oxygen-containing gas by heat exchange with a combustion gas and supplying the oxygen-containing gas to the fuel cell stack;
an exhaust gas combustor configured to combust the fuel gas discharged from the fuel cell stack as a fuel exhaust gas and the oxygen-containing gas discharged from the fuel cell stack as an oxygen-containing exhaust gas to produce the combustion gas;
a start-up combustor configured to combust the raw fuel and the oxygen-containing gas to produce the combustion gas; and
a hollow casing that is formed by outer wall surfaces and contains the fuel cell stack, the reformer, the air preheater, the exhaust gas combustor, and the start-up combustor,
wherein the outer wall surfaces are formed of a plurality of hollow surface members;
a single continuous fluid channel is formed by connecting spaces inside the surface members, and the fluid channel has one fluid inlet and one fluid outlet;
a first surface member has the fluid inlet of the fluid channel allowing fluid to flow initially in the first surface member; and
a fixing flange of a heating member that is inserted into the casing to form a heating source of the exhaust gas combustor is provided on the first surface member.

2. The fuel cell module according to claim 1, wherein a fixing flange of a heating member that is inserted into the casing to form a heating source of the start-up combustor is provided on the first surface member.

3. The fuel cell module according to claim 1, wherein the fluid is at least one of the fuel gas and the oxygen-containing gas to be supplied to the fuel cell stack.

4. The fuel cell module according to claim 1, wherein a guide plate configured to guide the fluid to the fixing flange is provided inside the first surface member.

5. The fuel cell module according to claim 4, wherein a partition plate is provided inside at least one surface member other than the first surface member for forming the fluid channel in a serpentine pattern and increasing the channel length of the fluid channel.

6. The fuel cell module according to claim 1, wherein the fluid channel has the fluid outlet in a second surface member that is the closest to the air preheater.

7. The fuel cell module according to claim 1, wherein the casing has a cubic shape or a rectangular parallelepiped shape including six surface members;
the fluid channel has the fluid outlet in a second surface member that is a surface member among the surface members that is closest to the air preheater; and
the fluid channel is formed inside at least two to four surface members other than the first surface member and the second surface member.

8. The fuel cell module according to claim 7, further comprising an evaporator configured to evaporate water and supply water vapor to the reformer;
the fuel cell stack, the reformer, the air preheater, the exhaust gas combustor, the start-up combustor, and the evaporator are assembled to form a fuel cell unit; and
the fuel cell unit is fixed to only a third surface member among the surface members of the casing.

9. The fuel cell module according to claim 8, wherein, for the fluid channel, the fluid is initially supplied into the first surface member, and then, supplied into the third surface member.

10. The fuel cell module according to claim 8, wherein an outer shape of the fuel cell unit is same as an inner shape of the casing.

* * * * *